United States Patent [19]

Robinson

[11] 4,413,313

[45] Nov. 1, 1983

[54] ELECTRICAL INVERTERS

[75] Inventor: Jeffrey I. Robinson, Bedforshire, England

[73] Assignee: Texas Instruments Incorporated, Dallas, Tex.

[21] Appl. No.: 399,106

[22] Filed: Jul. 16, 1982

Related U.S. Application Data

[63] Continuation of Ser. No. 307,351, Sep. 30, 1981.

[30] Foreign Application Priority Data

Oct. 7, 1980 [GB] United Kingdom ............... 8032309

[51] Int. Cl.³ .......................................... H02P 13/00
[52] U.S. Cl. .................................... 363/80; 363/97; 363/131; 363/16
[58] Field of Search ........................... 363/16, 18–21, 363/27–30, 79, 80, 97, 131, 135

[56] References Cited

U.S. PATENT DOCUMENTS

| | | |
|---|---|---|
| 3,568,038 | 3/1971 | Enders ............................... 363/131 |
| 3,863,126 | 1/1975 | Colyn . |
| 4,163,278 | 7/1979 | Onoue et al. ..................... 363/21 X |
| 4,196,469 | 4/1980 | Gurwicz ............................ 363/131 |
| 4,253,136 | 2/1981 | Nanko . |
| 4,276,586 | 6/1981 | Boekhorst ........................ 363/97 X |

FOREIGN PATENT DOCUMENTS 1132740 11/1968 United Kingdom .
1446689 8/1976 United Kingdom .
1597606 9/1981 United Kingdom .

Primary Examiner—William M. Shoop
Attorney, Agent, or Firm—N. Rhys Merrett; Mel Sharp; Gary Honeycutt

[57] ABSTRACT

An inverter which includes a resonant electrical circuit and a charging transistor arranged to charge an energy storage component of the resonant circuit periodically in synchronism with oscillations in the circuit so as to maintain the oscillations. A part of the oscillatory energy of the resonant circuit is transferred to an output circuit so that the inverter supplies output power.

The charging transistor forms part of a current-limiting switch and is controlled by a control circuit which is arranged to monitor the voltage across the transistor and to switch it on when the voltage lies between first and second limits, one of which preferably is at or near zero, and changing in a predetermined sense, such as to charge the resonant circuit in synchronism with oscillation thereof. The charging transistor then adds energy to the resonant circuit until the current-limit is reached. Charging is then stopped by the switching off of the transistor.

The inverter may include an automatic current-limit adjustment to compensate for output voltage changes and may include also a start-up circuit which operates when the charging transistor has not operated for a set time.

13 Claims, 9 Drawing Figures

ELECTRICAL INVERTERS

This is a continuation, of application Ser. No. 307,351, filed Sept. 30, 1981.

The invention relates to electrical inverters, particularly inverters suitable for use in electrical power supply apparatus.

Electrical inverters are used in electrical power supply apparatus as a means of obtaining a higher supply voltage level from a constant (dc) supply voltage. Known inverters effect the change from one supply voltage level, such as that obtainable from a battery, to a higher level by conversion of the constant voltage to an alternating voltage which is transformed to a higher level and the rectified. The same technique is used to effect voltage reduction with minimum power loss by the use of a step-down transformer.

Switching electrical inverters, in which the conversion to an alternating voltage is effected by a chopping action, are known, and are capable of high efficiencies because the chopping action is effected by solid-state devices operated a switches in order to minimise losses in the devices. The solid-state devices are usually transistors.

Switching electrical inverters as described above have inherently high electrical noise levels caused by the abrupt changes in energy flow which accompany the switching operations. Electrical noise is undesirable in power supply apparatus.

It is an object of the present invention to provide an inverter with inherently low noise levels and with efficiencies comparable to those of switching inverters.

According to the invention an inverter arranged to convert a constant electrical supply into an alternating electrical supply, includes:

(i) a resonant circuit arranged to store electrical energy and to generate sinusoidal electrical oscillations, (ii) current-limiting switch means capable of being enabled and disabled and when enabled for conducting current up to a set limit and holding the current at the set limit for effecting, charging of the resonant circuit with electrical energy from a d.c. electrical supply up to the set current limit;

(iii) a control circuit arranged to monitor the voltage across the switch means to enable the switch means to charge the resonant circuit periodically in synchronism with and to reinforce oscillations in the resonant circuit only while said voltage lies between first and second limits and is changing in a predetermined sense and to disable the switch means to stop charging of the resonant circuit when said voltage reaches said second limit consequent to current flow being held at said set limit by said switch means and (iv) output circuit means coupled to the resonant circuit arranged to supply electrical energy to a load circuit when coupled to the output circuit.

Advantageously, the control circuit is so arranged that when, in operation, the oscillations are of sufficient amplitude to cause zero voltage to exist periodically across the current-limiting switch means, the said first limit voltage is substantially zero.

Advantageously the control circuit includes a first comparator arranged to change its output state abruptly between two levels when the voltage across the current-limiting switch means passes through the second limit, a second comparator arranged to change its state abruptly between two levels when the current in the resonant circuit reverses direction, and an AND gate controlled by the comparators arranged to enable the current-limiting switch means only when the current flow from the electrical supply would be in such a sense as to reinforce oscillations in the resonant circuit.

Alternatively, the control circuit includes a first comparator arranged to change its output state abruptly between two levels when the voltage across the current-limiting switch passes through the second limit, a second comparator arranged to change its state abruptly between two levels when the voltage across the current-limiting switch means passes through zero, and circuit means controlled by the comparators arranged to close the current-limiting switch means while the voltage lies between zero and the said second limit, wherein the current-limiting switch means and the circuit means are so arranged that the current limiting switch means remains enabled after closure only when the voltage across the resonant circuit changes to be of the same sense as the electrical supply voltage.

Preferably, the current-limiting switch means includes a charging transistor arranged to charge the resonant circuit, means arranged to block reverse current in the transistor, a bleed transistor arranged to control operation of the charging transistor, and a current monitoring circuit arranged to monitor current flow in the charging transistor and to hold the charging current at the set current limit of the switch the current monitoring circuit being arranged to control the bleed transistor.

Preferably, the current-limiting switch is arranged to adjust the current limit in order to compensate for output voltage changes.

Preferably, the control circuit includes a start-up circuit which is arranged to be switched off by the operation of the current-limited switch means.

Preferably, the resonant circuit includes an inductor which is a primary winding of a transformer and, preferably, the resonant circuit is a series-connected circuit.

Inverters embodying the invention will now be described by way of example only and with reference to the accompanying drawings, in which.

Figure 1:
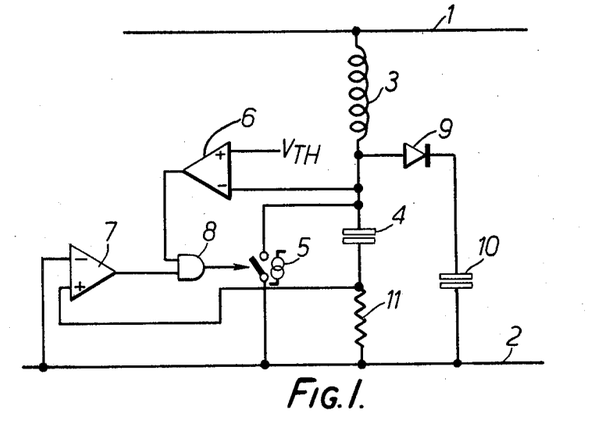
FIG. 1 is a block diagram functional representation of a switching inverter, according to the invention, employing a series resonant circuit and a current-limiting switch.

With reference to FIG. 1, an inverter according to the invention includes first and second terminals 1 and 2, respectively, a series resonant circuit consisting of an inductor 3 and a capacitor 4, a current-limiting switch 5, a voltage and current sensing comparators 6 and 7 which, together with an AND gate 8, are effective to control the switch 5, and an output circuit consisting of a diode 9 and acpacitor 10.

The terminal of the inductor 3 remote from the capacitor 4 is connected to the first terminal 1, and the terminal of the capacitor 4 remote from the inductor 3 is connected to the second terminal 2 by way of a low-value resistor 11 which acts as a current sensor for the comparator 7. The current-limiting switch 5 is connected between the junction of the capacitor 4 and the inductor 3. Each of the comparators 6 and 7 has two input terminals. The comparator 6 has one input terminal connected to the junction of the inductor 3 and the capacitor 4, the other input terminal connected to a reference voltage $V_{TH}$, and is arranged to give a high output when $V_{TH}$ is greater than the voltage on its other input terminal. The comparator 7 has one input terminal connected to the second terminal 2 of the inverter, the other terminal connected to the junction of the resistor 11 and the capacitor 4, and is arranged to give a high output when current through the resistor 11 is flowing to the second terminal 2 of the inverter. The comparators 6 and 7 are each capable of providing one of two possible output voltage levels according to the relative polarities of their respective input voltages.

The operation of the inverter may be understood by referring to FIG. 2 as well as FIG. 1 and is as follows: When a voltage supply is first applied to the terminals 1 and 2, current flows through the inductor 3, and the capacitors 4 and 10. The voltage developed across the resistor 11 causes the comparator 7 to give a high output and because the voltage across the capacitor 4 and the resistor 11 is nearly zero (less than $V_{TH}$) the comparator 6 will also give a high output. The AND gate 8 is controlled by the output signals of the comparator 6 and 7.

The AND of these two signals closes the current limiting switch 5 and the current in the inductor 3 increases until the set current is reached the switch 5 holds the current constant. At this point the voltage across the switch begins to rise and when $V_{TH}$ is exceeded the comparator 6 changes to a low output and switches off the current-limited switch by way of the AND gate 8. The inductor 3 now transfers energy into the capacitor 4, and on the first cycle into the capacitor 10. Eventually current begins to flow from the capacitor 4 to the inductor 3 and after half a cycle the voltage across the switch is again zero, but the current is flowing in the wrong sense, and the comparator 7 keeps the switch 5 open. After a cycle, both the comparators 6 and 7 go high, the voltage across the switch being substantially zero volts and the current flowing towards the second terminal 2. The switch 5 is turned on again and stays on until the set current limit is reached as before.

Energy absorbed by the load is replaced by recharging of the inductor 3. Recharging takes place once per cycle while the switch 5 is closed in synchronism with the resonant operation of the inductor 3 with the capacitor 4.

Figure 2:
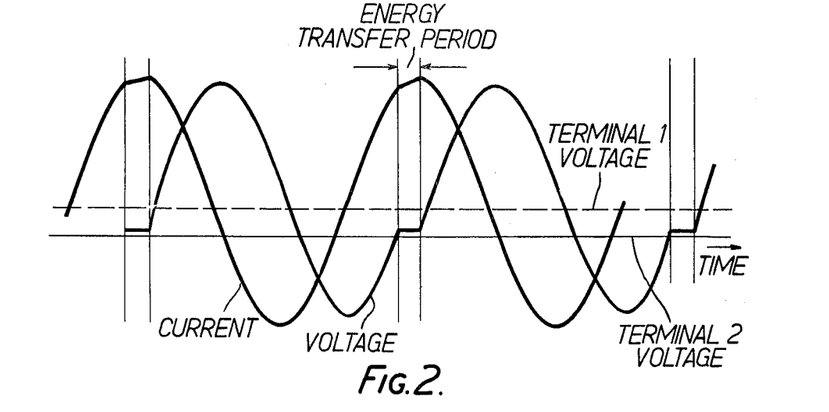
FIG. 2 represents the variation with time of the current in the inductor and the voltage across the current-limiting switch in the inverter of FIG. 1.

As can be seen from FIG. 2, the current and voltage waveforms are sunusoidal except for the inductor charging period. The method of operation described leads to minimal radiated interference and permits the use of relatively slow rectifiers in the load circuit. In addition, the use of zero voltage switching reduces switching losses.

Figure 3:
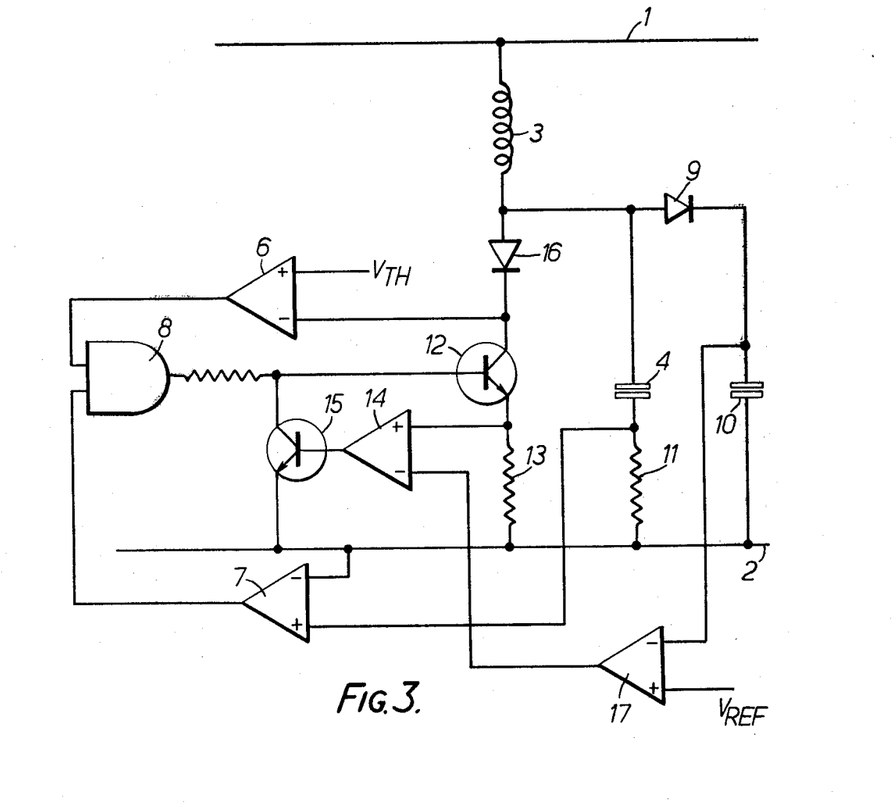
FIG. 3 represents, in block diagram detail, a working embodiment of FIG. 1.

Referring now to FIG. 3, a practical form of the inverter employs a first bipolar transistor 12 in combination with a resistor 13, a differential amplifier 14, and a second bipolar transistor 15, as a current limiting switch. A diode 16 is connected in the collector circuit of the first transistor 12 in order to prevent reverse conduction by the transistor 12. An error amplifier 17 is included between the load circuit and the current limited switch. The function of the error amplifier 17 is the stabilisation of the output voltage level by adjustment of the current limit of the switch. The other components are as described with reference to FIG. 1. The first transistor 12 acts as a charging transistor and the second transistor 15 acts as to bleed base current from the transistor 12 when the current limit is reached.

In FIG. 3, the first transistor 12 is connected with its collector and emitter terminals, respectively, replacing the terminals of the switch 5 of FIG. 1, and with the resistor 13 placed in its emitter circuit. The output terminal of the AND gate 8 is connected to the base terminal of the transistor 12, and the second transistor 15 has its collector terminal connected to the base terminal of the transistor 12 and its emitter terminal connected to the emitter circuit of the transistor 12 so that, when the transistor 15 is conductive, its acts as a bleed to the base-emitter circuit of the transistor 12. The differential amplifier 14 has one input terminal connected to the resistor 13, its other input terminal connected to the amplifier 17, and its output terminal connected to the base terminal of the transistor 15.

In FIG. 3 the current-limiting action takes place as follows:

The first transistor 12 is switched on by the AND gate 8 and current rises in the inductor 3. The current passes through the resistor 13 causing a rising input signal on one input terminal of the differential amplifier 14. The other input signal to the differential amplifier 14 is more or less constant and is the resultant error signal derived from a reference signal $V_{REF}$ and the output voltage level. The rising input signal eventually exceeds the constant signal, turning the transistor 15 on, to stabilise the current in the transistor 12. The stabilisation of the current in the transistor 12 is accompanied by a rise in its collector voltage level and the removal of its base drive by way of the comparator 6 and the AND gate 8.

Figure 4:
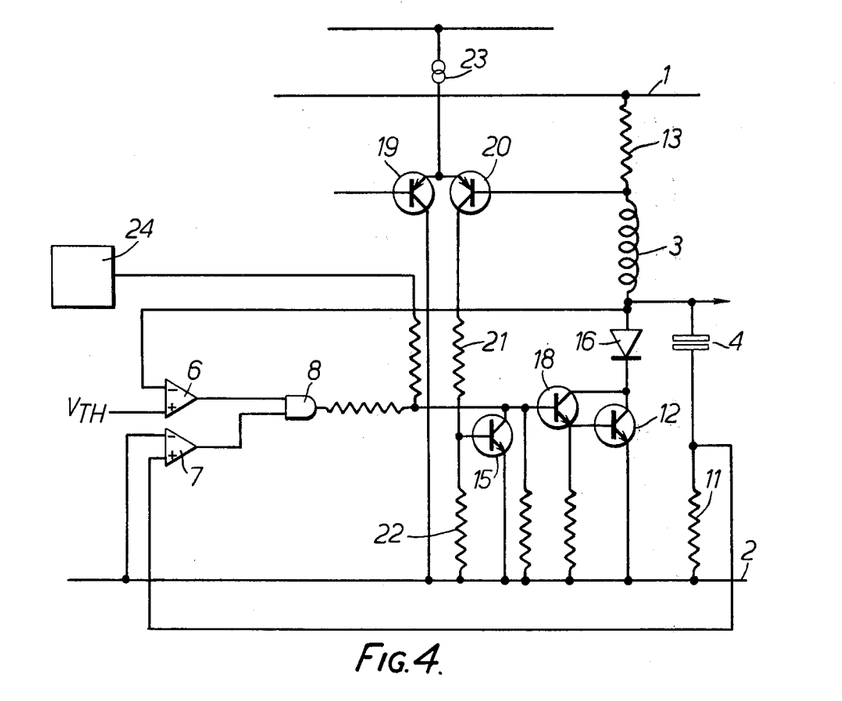
FIG. 4 shows in detal, a current-limit switch included in another form of the inverter which has a start-up circuit.

The current-limiting switch of FIG. 1 may be realised by the arrangement shown in FIG. 4 where a driver transistor 18 is provided for the transistor 12 of FIG. 3 and the differential amplifier 14 of FIG. 3 consists of a pair of transistors 19 and 20 with associated collector load resistor 21 and 22. The current sensing resistor 13 is transferred to the collector circuit of the transistor 12 and the transistor 19 and 20 are energised by a constant current source 23 feeding their emitters. FIG. 4 shows, in addition, a start-up circuit 24 which is connected to the base terminal of the driver transistor 18. The start-up circuit operates to drive the driver transistor 18 with a pulse at its base terminal. In both FIGS. 3 and 4, $V_{TH}$ is chosen to be just greater than the sum of the voltage drop across the collector diode 16 and the saturation voltage of the transistor 12, so that $V_{TH}$ is not quite zero volts but is quite small compared with the amplitude of the oscillations. The non-zero value for $V_{TH}$ is imposed by the limitation of available components.

Figure 5:
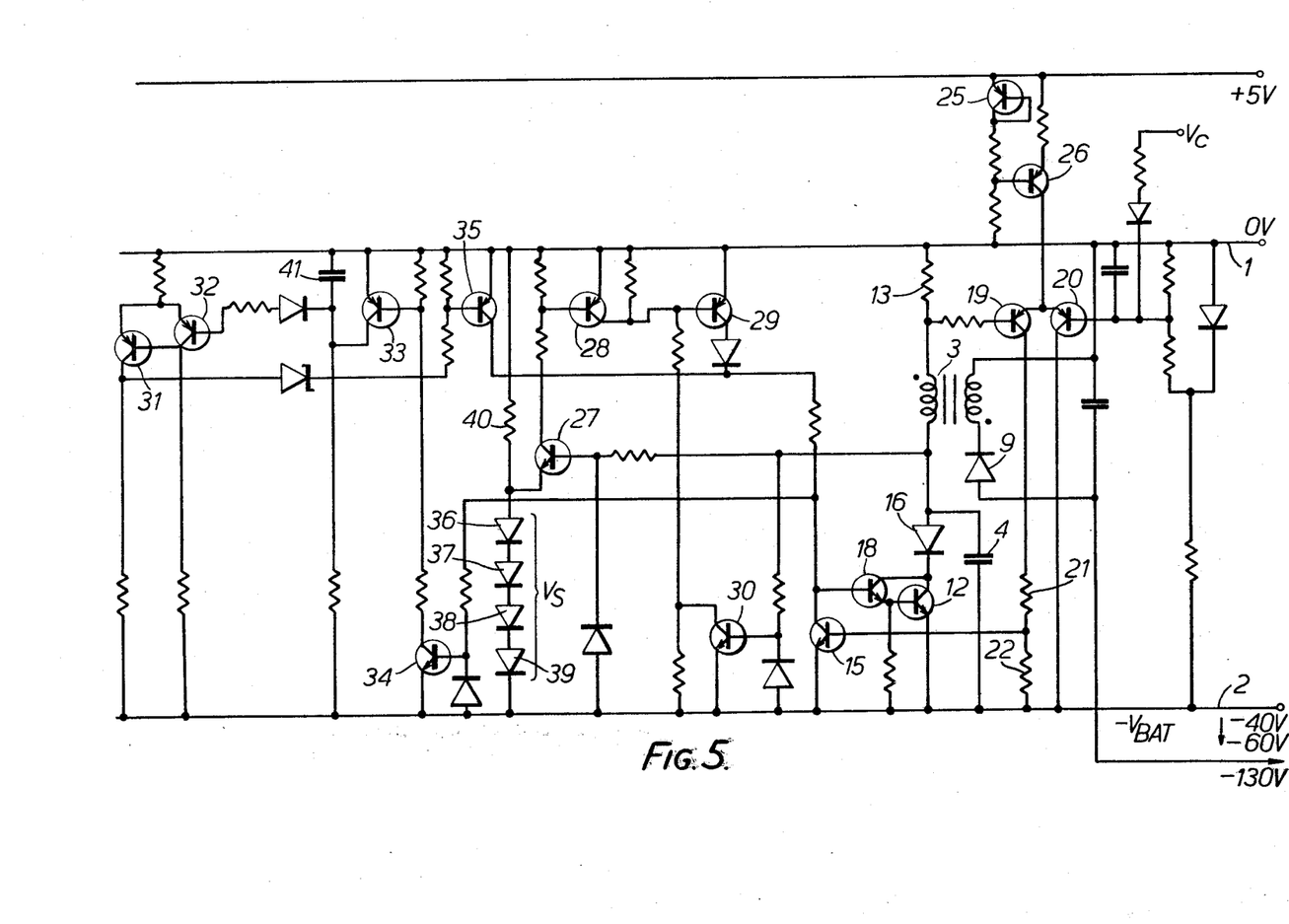
FIG. 5 shows in detail a first test model of the inverter based on the FIG. 4 arrangement.

A detailed circuit diagram of an inverter based on FIGS. 3 and 4 is shown in FIG. 5 where components having reference numerals not shown in either FIG. 3 or FIG. 4 may be identified as follows:

(a) Transistors 25 and 26 with the immediately adjacent resistors form the constant current source 23 of FIG. 4.
(b) Transistors 27 to 30 and immediately adjacent components provide the functions of the comparators 6 and 7 and the AND gate 8 and provide also a voltage direction sensing function.
(c) Transistors 31 to 35 provide the functions of the start-up circuit 24 of FIG. 4, the transistor 34 being arranged to link the operation of the start-up circuit to the operation of the main circuit.

In FIG. 5 the current direction sensing resistor 11 is not used. The voltage at the junction of the inductor 3 and the capacitor 4 is monitored by the transistor 30 which conducts when the monitored voltage exceeds the voltage at terminal 2 by the forward voltage drop of the transistor base-emitter diode. Conduction by the transistor 30 makes available base current for the switch transistor 12 by way of the transistors 29 and 18 unless the transistor 28 is conductive in which case the current for the transistor 30 comes from the transistor 28. The transistor 28 is made conductive by the transistor 27 becoming conductive. The transistor 29 is held off when the transistor 28 is conductive. The voltage level $V_{TH}$ shown in FIGS. 1, 2 and 4 is the voltage set at the emitter terminal of the transistor 27 by the diodes 36 to 39 and the resistor 40. In practice the transistor 27 would conduct during the period when the voltage level across the switch transistor 12 exceeds about 2 V and the transistor 30 would conduct during the period when the voltage level across the switch transistor 12 exceeds about 0.6 V. The 0.6 V threshold level for the transistor 30 corresponds to its base-emitter forward conduction threshold ($V_{be}$) and the 2 V threshold level for the transistor 27 corresponds to its forward base-emitter forward conduction threshold plus the forward conduction threshold for the diode chain 36 to 39.

In FIG. 5 the combined effect of the transistors 27 to 30 is the biassing of the transistor 18 for conduction only during times when the voltage across the switch transistor 12 lies between about 0.6 V and about 2 V. The transistor 18 drives the switch transistor 12 so that the switch transistor is conductive only in this voltage band. This arrangement is effective to limit charging of the resonant circuit to those periods during which the voltage level across the switch transistor 12 is about zero and has a positive gradient. The reason for this situation is as follows. When the voltage level across the switch transistor 12 is near zero, the capacitor energy level is low. The capacitor energy level is therefore low during the periods that the switch transistor 12 becomes conductive and the capacitor 4 is discharged by the switch transistor 12, during these periods, without any effect on the voltage level across the switch transistor 12. The voltage level across the switch transistor 12 rises above 0.6 V, the switch transistor 12 conducts as explained above. The conduction of the switch transistor 12 operates to reduce the voltage level across itself and to reduce the positive voltage gradient. The result is that the switch transistor 12 tends to "hold" in the conductive state and to charge the inductor 3 until the current limit is reached. In contrast, as the voltage level across the switch transistor 12 falls towards 2 V and the switch transistor 12 conducts, the negative voltage gradient is reinforced by a fall in the voltage level across the switch transistor 12 so that it accelerates through the conductive state with the voltage level continuing to fall. Once the voltage level falls below 0.6 V the switch transistor 12 returns to being cut off, and the transistor 31 also is cut off.

The diode 16, located in the collector circuit of the switch transistor 12, is effective to restrict current flow in the switch transistor 12 to the correct sense.

In FIG. 5, in normal operation, current pulses reaching the switch transistor 12 to turn it on are applied also to the transistor 34 to turn it on. One effect of conduction by the transistor 34 is that the transistor 33 is made conductive and a capacitor 41, connected across the transistor 33, is discharged. If the capacitor 41 is allowed to charge it triggers a Schmitt-trigger consisting of the transistors 31, 32 and their associated resistors, and the Schmitt-trigger circuit generates a pulse which is applied to the base terminal of the switch transistor 12 by way of the transistor 35. The Schmitt-trigger circuit is active at start-up.

In FIG. 5 the inductor 3 is the primary winding of a transformer. The secondary winding of the transformer is included in the output circuit of the inverter. The diode 9 in the output circuit rectifies the positive-going part of the waveform. The negative-going part of the waveform is significantly less than the positive-going part.

It will be noted that in FIG. 5 the control circuit operates from the main voltage supply used for charging the resonant circuit and from a single further supply which is used for the constant current source transistors 25 and 26. The main voltage supply level is −40 V and the further supply level is +5 V, both referenced to terminal 1 of FIG. 5. Also included in FIG. 5 is an output voltage adjustment circuit which includes a resistor 42 and a diode 43 and is arranged to apply a variable voltage obtained from the +5 V supply to the base terminal of the transistor 20. This variable voltage varies the output voltage level by varying the set current limit.

The overall efficiency of the inverter would be improved by operation of the control circuit from a voltage supply level which is lower than the main (−40 V) voltage supply.

Figure 7:
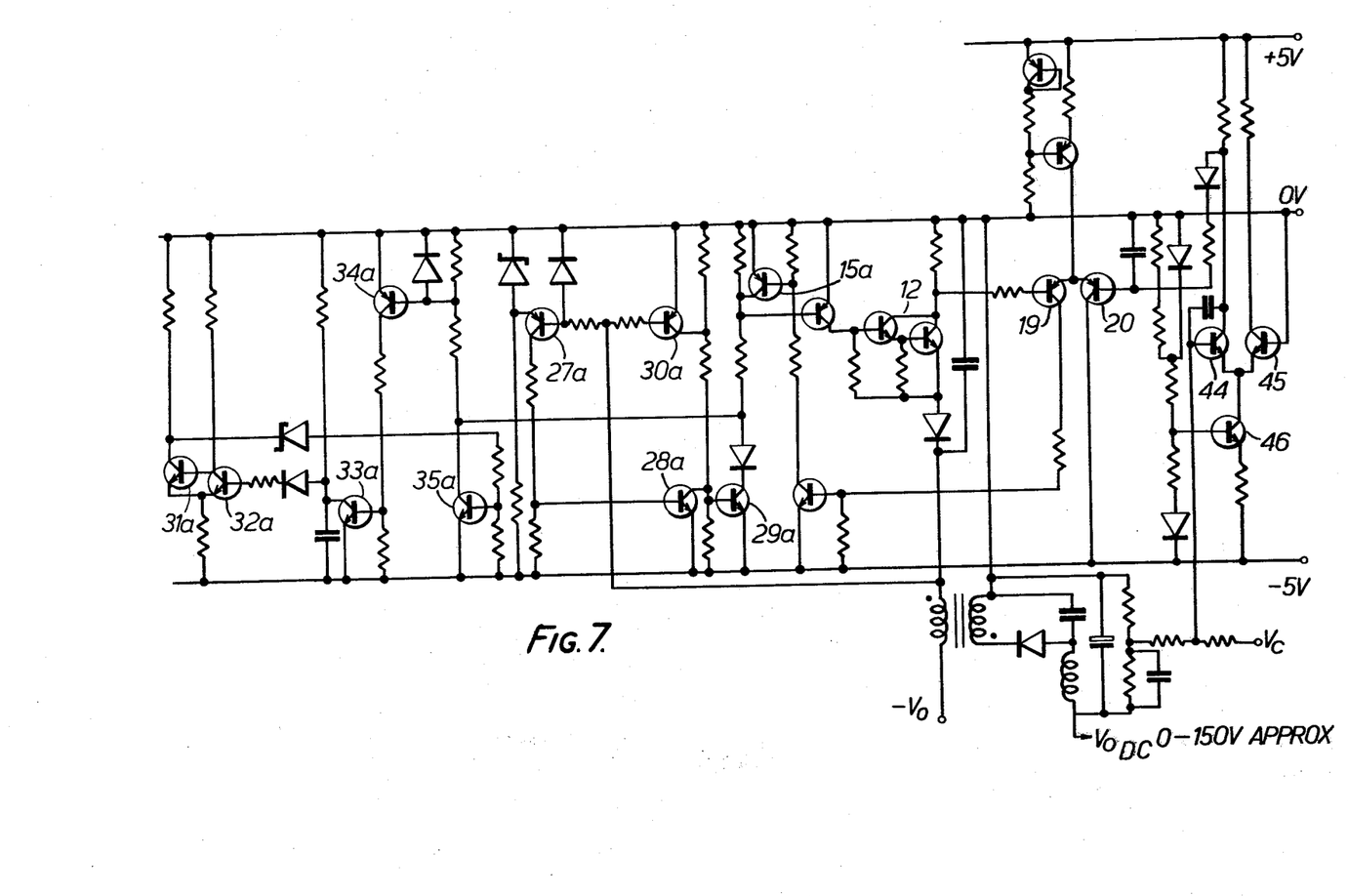
FIG. 7 shows in detail the working model inverter.

In FIG. 7 there is shown an inverter employing a synchronously charged resonant circuit as described above and in which a −5 V supply voltage level is used as the control circuit supply. The circuit includes an output voltage regulation circuit which includes a differential amplifier having two transistors 44, 45 connected as a differential pair to a current-source transistor 46. The transistor 44 is arranged to set the reference voltage for a transistor 20 which occupies the same position as and is equivalent to the transistor 20 of FIG. 5.

The control circuit of the inverter shown in FIG. 7 is inverted relative to that of FIG. 5. The switch transistor 12 is not inverted but is referenced to terminal 1. The operation of the control circuit of FIG. 7 is the same as that of FIG. 5, any differences in construction being due in general to the need to invert and level shift signals in order to accommodate the "non-inverted" switch transistor 12.

A suitable operating frequency for the inverter is 27 KHz. A practical form of the inverter operating at 27 KHz employs a toroidal core transformer with an air gap and 250 turns per winding tuned by a 0.01 μF capacitor.

The output power of each inverter is limited by the set current-limit and each is therefore self-protecting against short circuit. In the case of the inverter of FIG.

7, the regulation circuit will fail when the output circuit is overloaded.

The output voltage each inverter described above is adjustable by means of the current-limit adjustment.

Figure 6A:
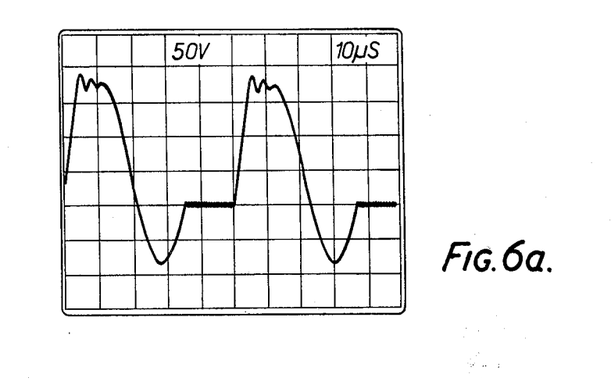
FIGS. 6a and 6b, show the output waveforms of the first test model inverter for full load at output voltages of 130 V and 50 $V_1$ respectively.

In FIG. 6a there is shown the waveform present across the switch transistor 12 of FIG. 5 when the output voltage is set at 130 V to supply a 6.6KΩ resistive load and the inverter is energised from a −40 V supply. The flat charging period is identifiable between the two part sinusoids.

Figure 6B:
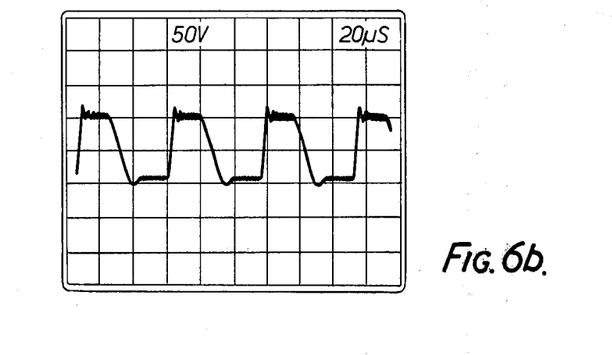

In FIG. 6b there is shown the waveform present across the switch transistor 12 of FIG. 5 when the output voltage is set at 50 V to supply a 1.5KΩ resistive load. The main supply is still −40 V.

Figure 6C:
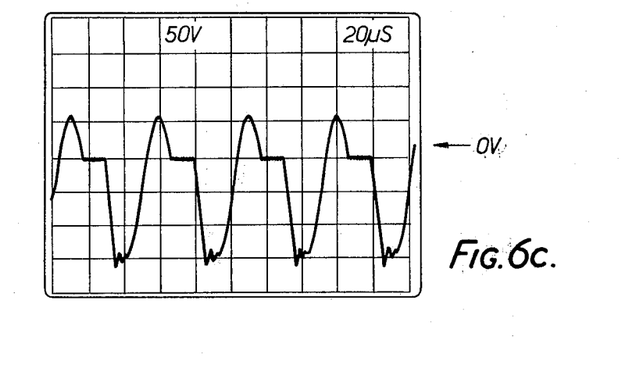
FIG. 6c shows the output waveform of a working model.

FIG. 6c shows the "inverted" waveform obtainable from FIG. 7.

The output voltage of the inverter may of course be controlled by varying the turns ratio of the transformer. Tests conducted on the inverter shown in FIG. 5 have established that with a main supply voltage of −40 V the following results are obtainable:

| Output voltage | Resistive load | Overall Efficiency |
| --- | --- | --- |
| 90 | 3.3 KΩ | 68% |
| 70 | 3.5 KΩ | 62% |
| 90 | 1.5 KΩ | 81% |
| 70 | 1.5 KΩ | 69% |
| 130 | 6.6 KΩ | 73% |
| 50 | 1.5 KΩ | 75% |
| 18 | 570Ω | 59% |

Tests conducted on the inverter of FIG. 7 for the same main supply voltage establish that the following results are obtainable:

| Output voltage | Resistive load | Overall Efficiency | Output voltage change no load to full load |
| --- | --- | --- | --- |
| 130 | 6.6 KΩ | 71.8% | <.4V |
| 50 | 1.5 KΩ | 81.7% | <.3V |
| 18 | 570Ω | 74.9% | <1.7V |

The inverter described above is particularly suitable for use in power supplies associated with telephone equipment where power supply noise would be undesirable. Telephone equipment in which such a power supply would be particularly valuable is, for example, subscriber line interface circuitry (SLIC).

What is claimed is:

1. An inverter for converting a d.c. electrical supply into an a.c. electrical supply, including:
    (i) resonant circuit means for storing electrical energy and for generating sinusoidal electrical oscillations;
    (ii) current-limiting switch means capable of being enabled and disabled and when enabled for conducting current up to a set limit and holding the current at the set limit for effecting charging of the resonant circuit with electrical energy from a d.c. electrical supply up to the set current limit;
    (iii) control circuit means for monitoring the voltage across the switch means to enable the switch means to charge the resonant circuit periodically in synchronism with and to reinforce oscillations in the resonant circuit only while said voltage lies between first and second limits and is changing in a predetermined sense and to disable the switch means to stop charging of the resonant circuit when said voltage reaches said second limit consequent to current flow being held at said set limit by said switch means; and
    (iv) output circuit means coupled to the resonant circuit for transferring alternating electrical energy to a load circuit when coupled to the output circuit means.

2. An inverter as claimed in claim 1, said control circuit means for determining said first voltage limit at substantially zero during operation of said resonant circuit means in which said oscillations are of sufficient amplitude to cause zero potential difference to exist periodically across the current-limiting switch means.

3. An inverter as claimed in claim 2, wherein the control circuit means includes a first comparator means for changing output state abruptly between two levels when the voltage across said current-limiting switch means passes through the second limit; second comparator means for changing output state abruptly between two levels when oscillatory current in the resonant circuit reverses direction; and an AND gate means circuit controlled by the comparators for enabling the current-limiting switch means only when the current flow from the electrical supply would be in such a sense as to reinforce oscillations in the resonant circuit.

4. An inverter as claimed in claim 2, wherein the control circuit means includes first comparator means for changing output state abruptly between two levels when the voltage across said current-limiting switch means passes through the second limit; second comparator means for changing output state abruptly between two levels when the voltage across the current-limiting switch means passes through zero; and circuit means controlled by the comparators for closing the current-limiting switch means while said voltage lies between zero and said second limit and for retaining the current-limiting switch enabled after initial enablement only when the oscillatory voltage across the resonant circuit changes to be of the same sense as the d.c. electrical supply voltage.

5. An inverter as claimed in claim 1 wherein said current-limiting switch means includes a charging transistor in the charging path of the resonant circuit, means for blocking reverse current in said charging transistor; bleed transistor means for controlling operation of the charging transistor; and current monitoring circuit means for monitoring current flow in the charging transistor to hold the charging current at said set limit of the switch means and controlling the bleed transistor.

6. An inverter for converting a d.c. electrical supply into an a.c. electrical supply, including:
    (i) resonant circuit means connected to a d.c. supply line for storing electrical energy and for generating sinusoidal electrical oscillations;
    (ii) current-limiting switch means including charging transistor means for conducting, when enabled, in one direction to supply charging current from said d.c. supply line to said resonant circuit up to a set limit and holding the current at the set limit; means for blocking conduction of said charging transistor in a direction opposite from said one direction; and means for monitoring charging current flow through said charging transistor and for disabling said charging transistor when said charging current reaches said set limit;
    (iii) control circuit means for monitoring transient current flow in said resonant circuit and for enabling said charging transistor means while said transient current flow lies between first and second limits and is changing in a predetermined sense, thereby periodically to provide charging current to the resonant circuit in reinforcing synchronism with oscillation of said resonant circuit.

7. An inverter as claimed in claim 6, wherein said means for monitoring charging current flow through said charging transistor includes a resistor connected in series with said charging transistor; comparator means for comparing the voltage developed across said resistor by said charging current with a reference voltage and for generating a charging transistor disabling signal when said charging current reaches said set limit.

8. An inverter as claimed in claim 7, wherein said control circuit means includes means for supplying a drive signal to said charging transistor while said transient current flow lies between said first and second limits and is changing in said predetermined sense; bleed transistor means connected to said charging transistor means; and means for applying said disabling signal to operate said bleed transistor to divert said drive signal at least in part from said charging transistor.

9. An inverter according to any of claims 6–8, including two comparators for comparing voltages generated in operation of said resonant circuit with reference voltages representing said first and second limits, and gating means operable by outputs from said comparators to enable said charging transistor only when said transient current flow lies between said first and second limits and is changing in said predetermined sense.

10. An inverter as claimed in claim 1 or claim 6, including means for adjusting said set value of the current to compensate for output voltage changes.

11. An inverter as claimed in claim 1 or claim 6, wherein the control circuit means includes start-up circuit means switched to an inoperable state by operation of said current-limiting switch means.

12. An inverter as claimed in claim 1 or claim 6, wherein the resonant circuit means includes an inductor forming a primary winding of an output transformer.

13. An inverter as claimed in claim 1 or claim 6, wherein said resonant circuit means comprises a series-connected circuit.

* * * * *